United States Patent
McCauley

(10) Patent No.: US 7,037,359 B1
(45) Date of Patent: May 2, 2006

(54) GREASE CONTAINMENT SYSTEM

(76) Inventor: Steven R. McCauley, 451 Nottingham Dr., Charlotte, NC (US) 28211

( * ) Notice: Subject to any disclaimer, the term of this patent is extended or adjusted under 35 U.S.C. 154(b) by 223 days.

(21) Appl. No.: 10/714,145

(22) Filed: Nov. 14, 2003

(51) Int. Cl.
B01D 53/04 (2006.01)
B01D 35/02 (2006.01)

(52) U.S. Cl. .............................. 95/141; 95/143; 95/273; 96/147; 55/323; 55/385.1; 55/522; 55/DIG. 36; 126/299 R; 454/49; 454/366

(58) Field of Classification Search .................. 55/323, 55/356, 385.1, 428, 467–473, 502, 522, 527, 55/528, DIG. 36; 95/90, 141, 143, 273; 96/108, 147; 126/299 R, 299 D, 299 E, 126/300, 301; 454/49, 341, 365, 366
See application file for complete search history.

(56) References Cited

U.S. PATENT DOCUMENTS

| | | | | |
|---|---|---|---|---|
| 1,076,942 | A * | 10/1913 | Backmire ............... | 126/299 R |
| 1,620,266 | A | 3/1927 | McCarthy | |
| 2,096,262 | A * | 10/1937 | Roth ........................... | 55/417 |
| 2,889,007 | A * | 6/1959 | Lunde ........................ | 55/317 |
| 3,278,114 | A * | 10/1966 | Gibbs ........................ | 454/354 |
| 3,494,108 | A * | 2/1970 | Moragne .................... | 96/233 |
| 3,516,232 | A * | 6/1970 | Gilbertson .................. | 96/147 |
| 4,236,902 | A * | 12/1980 | Fricke ........................ | 96/137 |
| 4,450,756 | A * | 5/1984 | Kling ........................ | 454/67 |
| 4,506,655 | A * | 3/1985 | Kuechler ................ | 126/299 D |
| 4,635,617 | A | 1/1987 | Simonsen ................... | 126/299 |
| 4,869,236 | A | 9/1989 | Blough ....................... | 126/299 |
| 5,139,546 | A * | 8/1992 | Novobilski ................. | 96/142 |
| 5,196,040 | A | 3/1993 | Malloy et al. ............... | 55/323 |
| 5,228,428 | A * | 7/1993 | Jang ....................... | 126/299 D |
| 5,318,607 | A | 6/1994 | Malloy et al. ............... | 55/323 |
| 5,470,365 | A * | 11/1995 | Jang ............................ | 55/510 |
| 5,512,073 | A | 4/1996 | Mirza et al. ................. | 55/323 |
| 5,537,988 | A * | 7/1996 | Lin ......................... | 126/299 D |
| 5,540,744 | A | 7/1996 | Renna ........................ | 55/323 |
| 5,567,216 | A | 10/1996 | Mirza et al. ................. | 55/323 |
| 5,641,340 | A * | 6/1997 | Kagan ......................... | 95/273 |
| 5,662,097 | A * | 9/1997 | Panos ..................... | 126/299 E |
| 5,814,115 | A | 9/1998 | Allen et al. ............... | 55/350.1 |
| 6,010,558 | A | 1/2000 | Ackland ..................... | 95/141 |
| 6,143,047 | A | 11/2000 | Jodoin et al. ............... | 55/323 |
| 6,149,701 | A | 11/2000 | Ellingson ................... | 55/493 |
| 6,391,074 | B1 | 5/2002 | McCrary .................... | 55/321 |
| 6,468,323 | B1 | 10/2002 | Chwala ....................... | 55/490 |
| 6,648,937 | B1 * | 11/2003 | Nguyen et al. ............. | 55/421 |
| 6,676,723 | B1 * | 1/2004 | Chwala ....................... | 55/421 |

OTHER PUBLICATIONS

Kimberly-Clark Filtration Products brochure, available as of filing date.
Spilfyter Innovative Spill Control Products brochure; available as of filing date.

* cited by examiner

Primary Examiner—Robert H. Spitzer
(74) Attorney, Agent, or Firm—Womble Carlyle Sandridge & Rice, PLLC

(57) ABSTRACT

A device, system, and method for collecting grease on rooftop exhaust fans, comprising a gasket formed of sorbent material. The gasket is dimensioned for placement between an exhaust fan and a base for the exhaust fan. When placed between the exhaust fan and the base for the exhaust fan, grease is absorbed and retained by the gasket during operation of the exhaust fan.

22 Claims, 4 Drawing Sheets

GREASE CONTAINMENT SYSTEM

FIELD OF THE INVENTION

The present invention relates to systems for collecting and containing grease or oil, and, more particularly to a grease containment system for collecting grease that is discharged from rooftop-mounted exhaust ducts.

BACKGROUND OF THE INVENTION

Restaurants, especially fast food restaurants, produce high volumes of waste grease (from fatty foods) that is typically, and unavoidably, discharged through roof-mounted exhaust systems. These roof-mounted systems are conventionally built with an exhaust fan unit mounted atop a base, or pedestal, that projects upwardly from the roof. The grease discharged upward from these systems, however, often accumulates on the roof. Conventional roofing products will generally become soft and will deteriorate following prolonged exposure to these organic fats and oils, leading to roof failure. Moreover, grease and oil can create safety problems for maintenance workers and the increased potential for fire. Furthermore, water runoff from the rooftop may be contaminated from the grease and oil, creating pollution problems in the vicinity of the restaurant.

Numerous attempts to contain the grease discharged from restaurant exhaust systems have resulted in less than effective or efficient methods and systems. One such attempt has been the installation of polycarbonate roof exhaust fan gutter systems (see FIG. 1, gutter 140 mounted around the exhaust fan 150 and exhaust fan pedestal 110 interface) to collect grease discharged from the exhaust fans; however, grease is not prevented from seeping between the hard, substantially inflexible contact surfaces, contaminating the surface of the roof. Additionally, these gutters must be periodically emptied and cleaned, or replaced, requiring substantial labor and maintenance costs. If not cleaned on a regular basis, the gutters fill up and run over, defeating their intended function.

Another known construction comprises a frame structure which is directly mounted to the roof (see FIG. 2, frame structure 232 and sorbent layered material 234 mounted about exhaust fan 250 pedestal 210 adjacent the roof 205) and surrounds the pedestal upon which the exhaust fan is mounted. The frame structure 232 holds one or more layers of sorbent material 234 in place. Unfortunately, grease still seeps down between the exhaust fan pedestal 210 and the frame structure 232, soiling the roof. Additionally, where the roof has any slope whatsoever, the frame construction becomes problematic to install and is only marginally effective at containing discharged grease. Moreover, constructions of this type require very labor intensive installations and frequent replacement of soiled sorbent materials. In many municipalities, building codes prohibit such installation techniques.

Yet other attempts to contain grease have involved the construction of filters that are attached to grease discharge spouts; however, such constructions fail to capture grease that tends to migrate through other openings, seams, or the juncture of the exhaust fan and exhaust fan pedestal.

SUMMARY OF THE INVENTION

The present invention is directed to a simple, economical, and disposable device and system for collecting grease, and to a method for collecting grease, that is discharged from rooftop exhaust fans of the type that provide ventilation for restaurants. Further, the present invention solves the problems with the prior art collection devices and systems.

In one embodiment, the device for collecting grease comprises a gasket formed of a sorbent material, such as polypropylene. In one embodiment, this material is cuttable and shapeable and has the capacity to absorb at least 4 quarts of grease or oil per square yard. The gasket is dimensioned for placement between an exhaust fan and a base, or pedestal, for the exhaust fan. When placed between the exhaust fan and the base for the exhaust fan, grease that would otherwise migrate through the fan and base interface is absorbed and retained by the gasket. In one gasket construction, the gasket is dimensioned to extend outwardly from and around the periphery of the exhaust fan and base for the exhaust fan. This permits the periphery of the gasket to be shaped to form a gutter around the exhaust fan and base for the exhaust fan. Thus, the gasket and gutter combination may both absorb and collect a significant volume of grease. Because rain water or condensation may also have a tendency to collect in the gutter, a plurality of perforations are formed in the gasket so that some of the perforations will be positioned near the bottom of the gutter. Because water is more dense than oil or grease, the water will drain out of the gutter through the perforations. At least one strap is provided for attaching the gasket around the periphery of the base for the exhaust fan and for shaping the gutter.

A second embodiment of the present invention is directed to a rooftop exhaust fan system comprising an exhaust fan, a base for mounting the exhaust fan thereon, and a gasket formed of sorbent material. Again, the gasket is dimensioned for placement between the exhaust fan and the base for the exhaust fan to absorb and retain grease.

A further aspect of the present invention is directed to a method for collecting grease from rooftop exhaust fan systems. Conventional rooftop exhaust fans are either simply supported by a base, or pedestal, or are hingedly connected to the base. As a first step, the exhaust fan must be removed from atop the base. An unused, or fresh, sorbent gasket that has been cut to the appropriate size and shape is placed over the periphery of the base. The exhaust fan is then replaced atop the base for the exhaust fan as before. Where the gasket is dimensioned to extend outwardly from the periphery of the fan/base interface, it may be subsequently shaped into a gutter around the periphery of the base for the exhaust fan. In one embodiment, this is accomplished by the use of straps or cords that are attached or inserted around the gasket.

In operation, the gasket absorbs any grease leaking between the exhaust fan and the base for the exhaust fan. Excess grease is collected in the gutter. At a specified operational interval, the above process is repeated, and the soiled gasket is replaced with a new unused gasket.

These and other aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed.

DETAILED DESCRIPTION OF THE PREFERRED EMBODIMENTS

Figure 1:
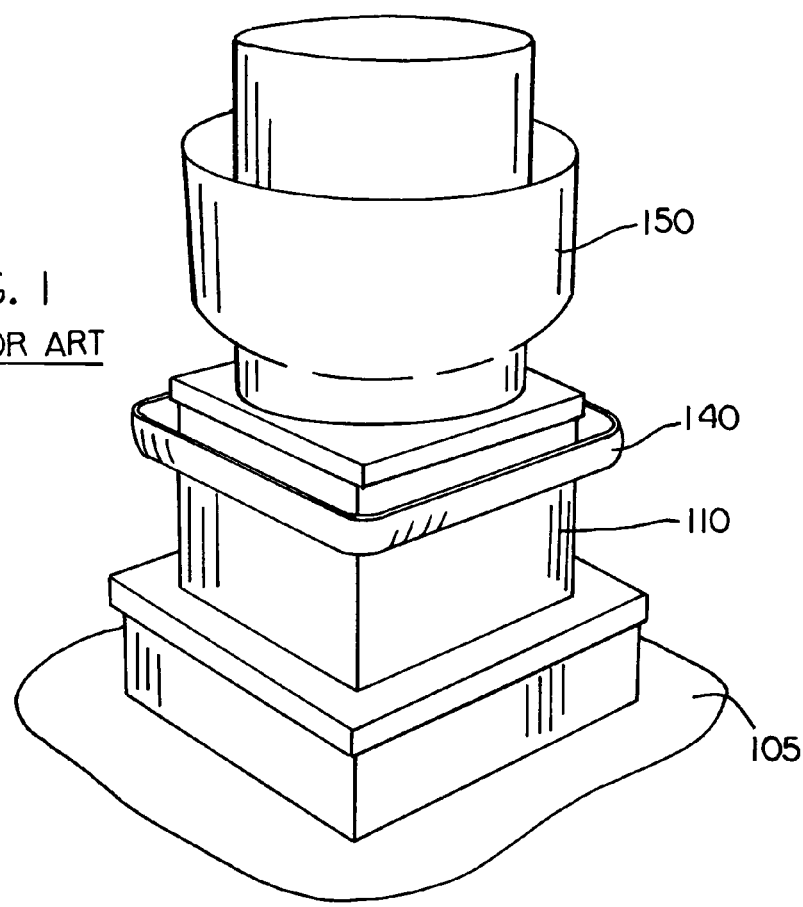
FIG. 1 is one embodiment of a prior art grease containment construction.
Figure 2:
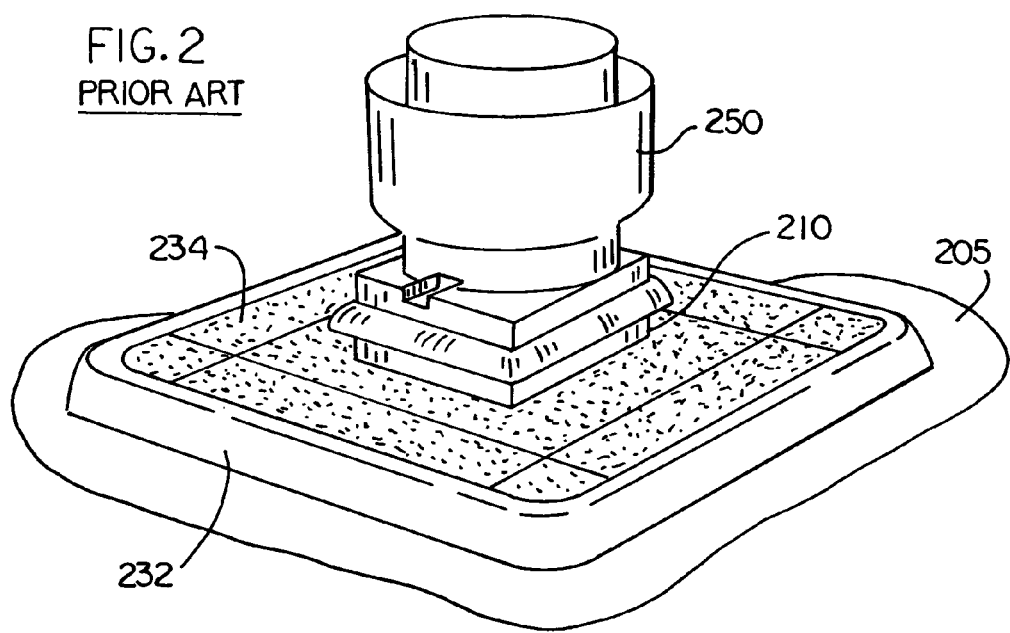
FIG. 2 is an alternative embodiment of a prior art grease containment construction.

Referring again to FIGS. 1 and 2, a conventional construction for rooftop exhaust fan systems is shown. Typically, when grease collection measures are not installed, such a system is comprised of an exhaust fan pedestal 110,210, which extends upwardly from the roof 105, 205 and is in air communication with the interior air volume of the restaurant. Usually, the exhaust fan inlet is located over the grill or cooking area of the restaurant. Pedestals 110, 210 are conventionally formed of rigid, but relatively thin, galvanized sheet materials. Further, the pedestals 110, 210 may be of various geometries, but are usually either round or square. Mounted atop the pedestals 110, 210 are the exhaust fan units 150, 250 which typically house a centrifugal fan (not shown) that is electrically powered via electrical connections on the roof 105, 205. The exhaust fan units 150, 250 are loosely mounted with hinges, screws, or the like, so that they may easily be removed for maintenance or replacement. As described above, prior art grease collection/containment systems such as the gutter construction 140 shown in FIG. 1, or the frame and pad construction 232, 234 shown in FIG. 2, have been developed as attempts to address the exhausting grease problem from these conventional exhaust fan units 150, 250.

Figure 3:
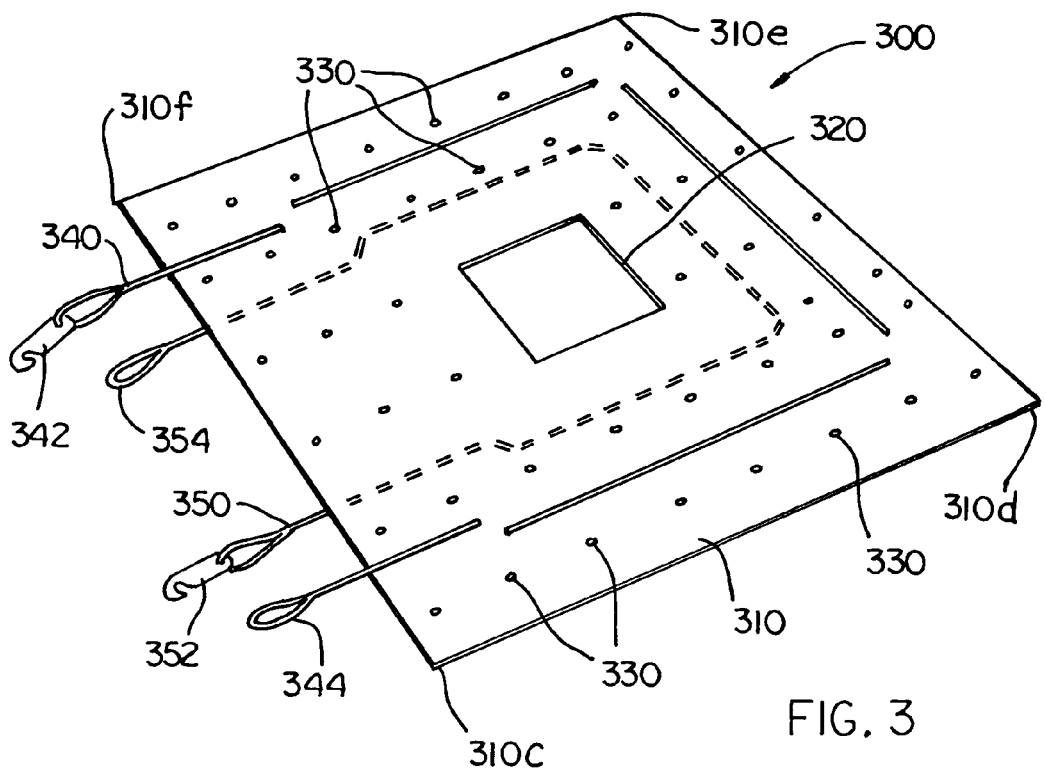
FIG. 3 is a top perspective view of the device for collecting grease on rooftop exhaust fans according to the present invention.

Turning now to FIG. 3, one aspect of the present invention is directed to a simple, economical, and disposable device for collecting grease that is exhausted from rooftop exhaust fans. One embodiment of the disposable device, shown generally as 300, comprises a gasket 310 formed of a sorbent material. As used herein, "gasket" refers to any of a variety of seals or packings used between matched machine parts or around joints to prevent the escape of a gas or liquid. Also, as used herein, "sorbent material" refers to any material or substance that has a substantial capacity for absorbing oil and/or grease, or a compound that absorbs, or entraps oil and/or grease. One such sorbent material is meltblown or spunbond polypropylene. Polypropylene is resistant to a wide range of chemicals, rot, and mildew. The large surface area to weight ratio of meltblown or spunbond polypropylene makes it quite suitable for easy installation and removal as an absorbent collection material. While it is naturally hydrophobic, which is ideal for outdoor use, this material also has an excellent wicking and fluid retention capacity for semi-liquids such as grease. Furthermore, because it can be used in temperatures up to about 270 degrees Fahrenheit, polypropylene will not degrade due to the heat from the exhaust fan.

One suitable polypropylene sheet material is commercially available from Kimberly-Clark Corporation as Part M-75. The material is available in various thicknesses; however, the thickness of the sorbent sheet material is not critical so long as it satisfies the functional characteristics described herein. In one embodiment, a thickness of between about ⅛ inches and ⅜ inches has been found suitable for the gasket 310. It has been found that a gasket 310 about ⅜ inches thick will absorb at least 4 quarts of oil or grease per square yard. While the gasket 310 is formed substantially from polypropylene, it may comprise other materials, synthetic or manmade, in its construction.

The gasket 310 is dimensioned for placement between an exhaust fan and the pedestal, or base, upon which the exhaust fan is mounted. As shown in FIG. 3, the gasket 310 is substantially square to fit a substantially square pedestal and exhaust fan; however, the gasket 310 material can be cut into any desired generally planar shape. An aperture, or opening, 320 is formed through the center of the gasket 310 to permit the flow of exhaust air therethrough when the gasket 310 is installed and the exhaust fan unit is placed in operation. A plurality of spaced-apart perforations 330 are formed in the gasket 310. As will be explained in greater detail below, the perforations are randomly formed so that they will provide drainage for water through the gasket 310. As will also be explained in greater detail below, at least one strap, 340 or 350, is interlaced through the gasket 310 for securing the gasket around the base for the exhaust fan. As will be appreciated from the discussion below, the straps, 340 or 350, are interlaced along three of the 4 sides of the gasket 310, but could be interlaced through all 4 sides, or the entire periphery of the gasket 310. One end of each strap 340, 350 comprises a loop, or catch, 344, 354, while the other end of each strap 340, 350 includes a hook or latch 342, 352. Alternatively, the hook or latch 342, 352 may frictionally engage the opposite ends of the strap 340, 350. As will be appreciated by those skilled in the art, the ends of the straps 340, 350 may simply be tied; loops and latches are not required for the straps 340, 350 to be tightened.

Figure 4:
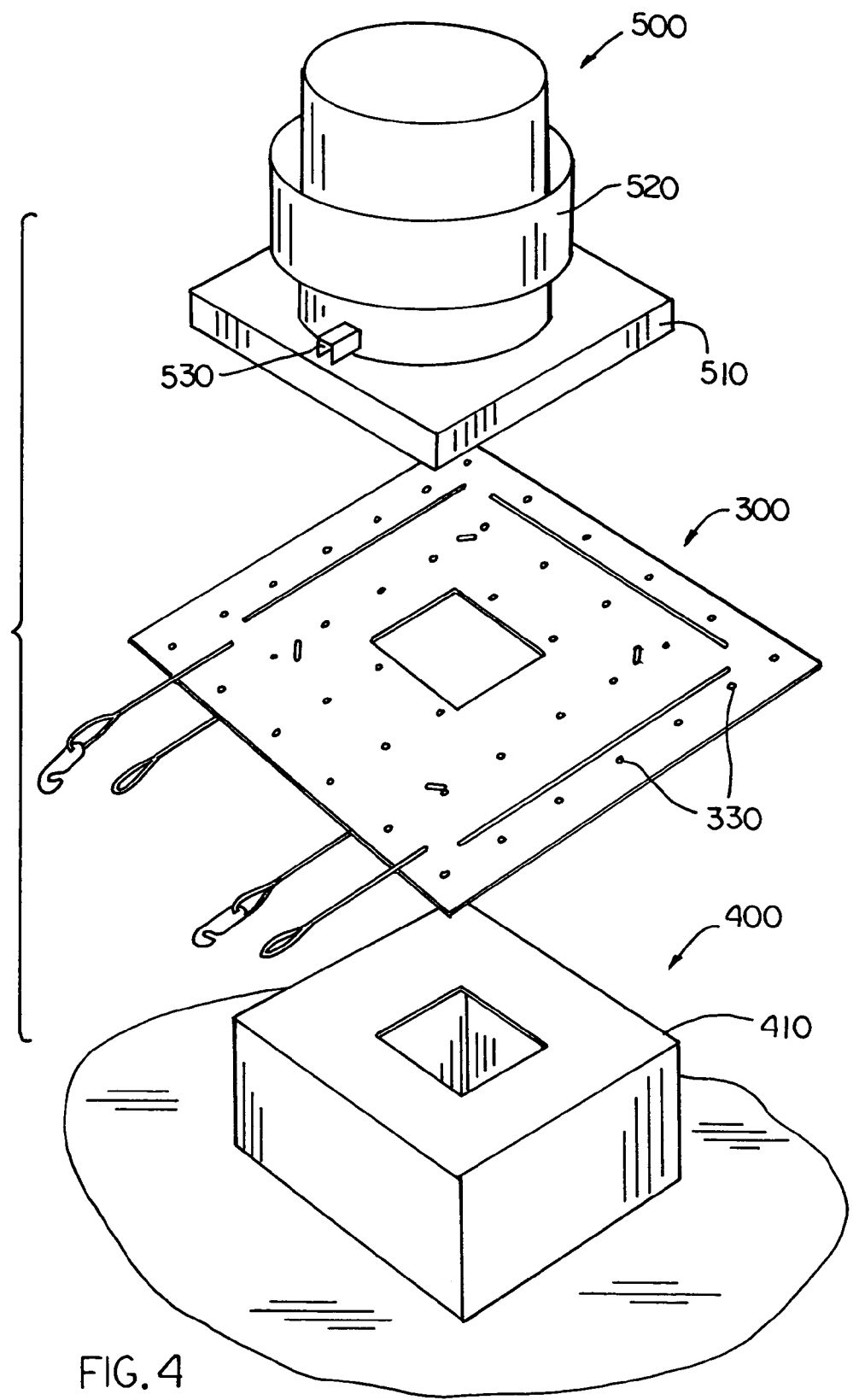
FIG. 4 is an exploded view of the rooftop exhaust fan system according to the present invention.

Referring now to FIG. 4, an exploded view of a second aspect of the present invention is illustrated. As shown in FIG. 4, the rooftop exhaust fan system 500 comprises an exhaust fan base 400, an exhaust fan unit 520, and a gasket 300 formed of sorbent material positioned therebetween the exhaust fan unit 520 and the base 400. As will be understood, the gasket 300 need only be dimensioned so that it is securely held between the periphery 410 of the base 400 and the periphery 510 of the exhaust fan 520. So long as the gasket 300 is sandwiched between the peripheral edges 510, 410, the gasket 300 will suitably function as a seal and as an absorbent media for grease that would otherwise seep or migrate through the exhaust fan 520 and base 400 interface.

Figure 6A:
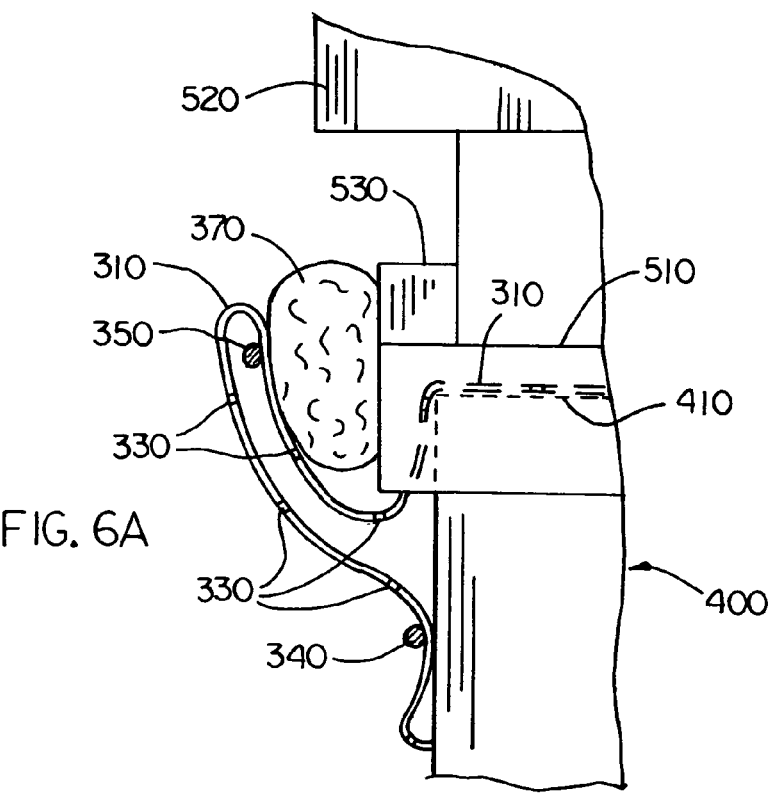
FIG. 6A is an enlarged side sectional view of the gutter configuration of FIG. 6.
Figure 5:
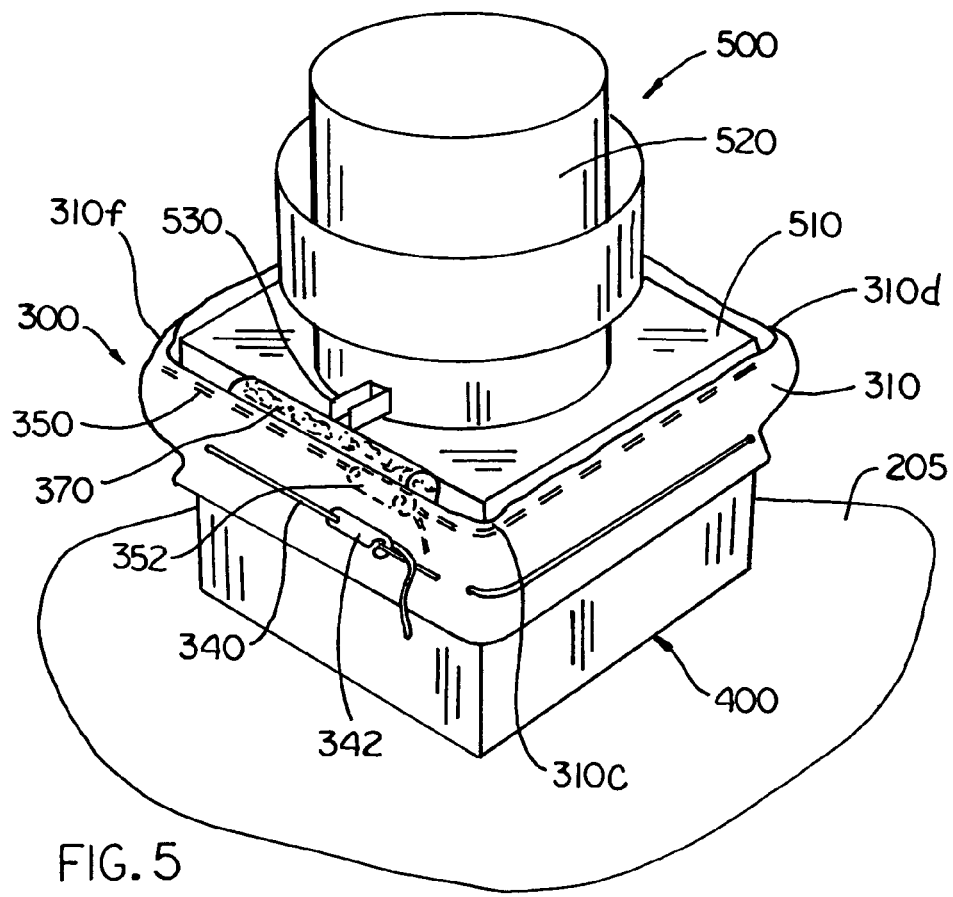
FIG. 5 is a top perspective view of the rooftop exhaust fan system of FIG. 4.

Turning now to FIGS. 5 and 6A, the rooftop exhaust fan system of the present invention is shown in greater detail. When the device 300 of the present invention is installed on a typical rooftop exhaust fan unit, the gasket 310 is seated between the base 400 and the exhaust fan 520. As shown in the figures, the gasket 310 is dimensioned, in one preferred embodiment, to extend outwardly around the entire periphery of the exhaust fan 520 and base 400 interface. As will be appreciated by those skilled in the art, the greater the surface area and volume of the sorbent material, and hence, the device 300, the greater the capacity of the device 300 to absorb grease that would otherwise seep through and leak out of the fan/pedestal interface.

Figure 6:
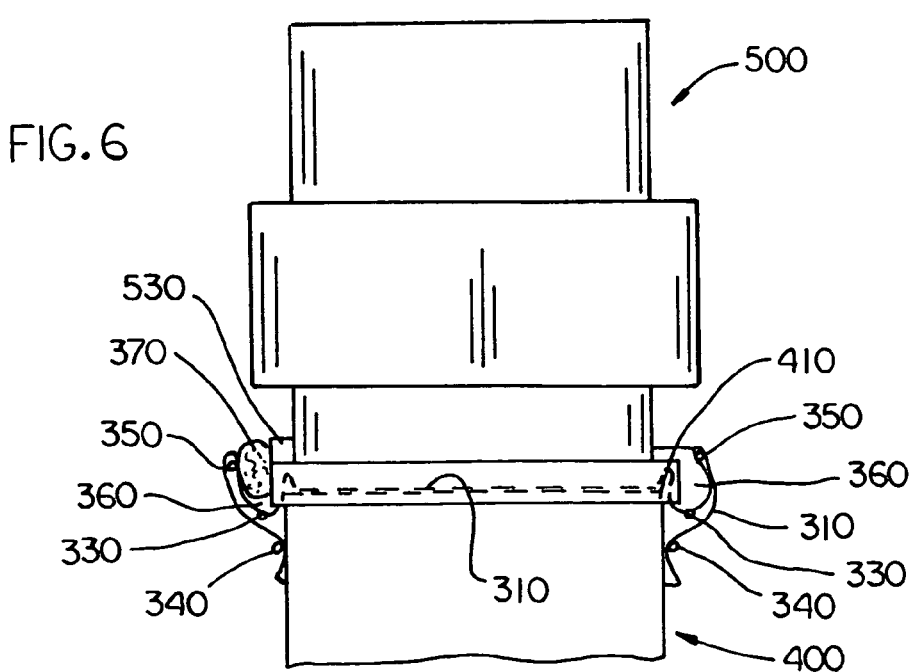
FIG. 6 is a side elevation view of the rooftop exhaust fan system of FIG. 5.

It has been found that the device 300 may be dimensioned to extend outwardly a sufficient distance so that the flexible sorbent material on the exterior of the exhaust fan unit may be shaped and configured into a gutter 360 around the entire periphery of the unit. As will be understood from the figures, that sorbent material which extends outwardly could be simply folded downward without forming a gutter 360, if desired; however, as shown in FIGS. 5 and 6, a strap 350 may be used to "draw up" the outwardly extending material. The ends 352, 354 or the strap 350 could then be connected together so that a portion of the gasket material is held upward. Strap 350 is positioned a sufficient distance from the periphery of the base 400 and fan 500 so that the portion of sorbent material extending outwardly to the strap 350 may be easily shaped into a gutter 360, or pocket, form. Strap 350 thus facilitates shaping and holding the gutter 360 in place. The corners 310c, d, e, and f will be slightly upturned when the strap 350 drawn up. Additionally, as best shown in FIGS. 3 and 6, perforations 330 are so located on the gasket 310 that some of them are positioned at the lower part of the gutter 360 when the device 300 is installed. This facilitates the drainage of water through the gutter 360, while any grease is contained in the gutter 360.

While not necessary, an additional strap 340 may be used to draw down the edges of the sorbent material for more secure attachment against the base 400.

As an additional measure of grease retention, a pad 370, or pillow, formed of the same sorbent material may be installed where the exhaust fan construction includes a drainage spout 530. The pad 370 desirably has a slot (not shown) for insertion of the spout 530 therein. It has been found that where the pad 370 is positioned in and supported by the gutter 360, the grease absorption capacity of the grease collection system is substantially increased. Further, as those skilled in the art will appreciate, other potential sources of grease discharge located above the gasket 310 will ultimately be trapped and absorbed by the sorbent material of the device 300 of the present invention. Whereas grease could seep around the collection systems of the prior art devices, the continuous form of the sorbent gasket 310 and gutter 360 configuration will prevent dripping grease from reaching the roof 205.

Another aspect of the present invention is directed to a method for collecting grease from rooftop exhaust fan units. As described hereinabove, the gasket 310 is dimensioned for the specific size and shape of the exhaust fan/base on which it is to be installed. Once the gasket has been dimensioned, the installation involves a first step of displacing the exhaust fan from atop the base for the exhaust fan. The gasket is then positioned and aligned over the periphery of the base. The exhaust fan is then replaced atop the pedestal. Where the gasket material has been dimensioned for a gutter configuration, the gasket is shaped into a gutter around the periphery of the exhaust fan. As described above, adjusting straps may be used to form the gutter. The exhaust fan unit may then be placed in operation, wherein the gasket absorbs grease leaking between the exhaust fan and the base for the exhaust fan with excess grease collecting in the gutter. At a specified operational interval, the process is repeated by displacing the exhaust fan from atop the pedestal, removing the used gasket material, and repeating the steps of placing an unused absorbent gasket over the periphery of the base, replacing the exhaust fan atop the base, and shaping the periphery of the gasket into a gutter. The entire process can be performed in minutes, rather than hours.

Although the present invention has been described with exemplary constructions, it is to be understood that modifications and variations may be utilized without departing from the spirit and scope of the invention, as those skilled in the art will readily understand. Such modifications and variations are considered to be within the purview and scope of the appended claims and their equivalents.

I claim:

1. A method for collecting grease from rooftop exhaust fans having a base and a fan mounted thereon, comprising:
   (a) displacing the exhaust fan from atop the base for the exhaust fan;
   (b) placing an absorbent gasket over the periphery of the base for the exhaust fan; and
   (c) replacing the exhaust fan atop the base for the exhaust fan, wherein in operation the gasket absorbs grease leaking between the exhaust fan and the base for the exhaust fan.

2. The method of claim 1 further including a first step of dimensioning the gasket for a specific size and shape of exhaust fan and exhaust fan base.

3. The method of claim 1 further including the step of using an adjusting strap to form a gutter around the periphery of the base for the exhaust fan after replacing the exhaust fan atop the base.

4. A method for collecting grease from rooftop exhaust fans having a base and a fan mounted thereon, comprising:
   (a) displacing the exhaust fan from atop the base for the exhaust fan;
   (b) placing an unused absorbent gasket over the periphery of the base for the exhaust fan;
   (c) replacing the exhaust fan atop the base for the exhaust fan;
   (d) shaping the periphery of the gasket into a gutter around the periphery of the base for the exhaust fan, wherein in operation the gasket absorbs grease leaking between the exhaust fan and the base for the exhaust fan and collects excess grease in the gutter;
   (e) at a specified operational interval, displacing the exhaust fan from atop the base;
   (f) removing the gasket material; and
   (g) repeating the steps of placing an unused absorbent gasket over the periphery of the base, replacing the exhaust fan atop the base, and shaping the periphery of the gasket into a gutter.

5. A device for collecting grease on rooftop exhaust fans, comprising:
   (a) a gasket formed of sorbent material;
   (b) the gasket being dimensioned for placement between an exhaust fan and a base for the exhaust fan; and
   (c) wherein when placed between the exhaust fan and the base for the exhaust fan, grease is absorbed and retained by the gasket.

6. The device of claim 5 wherein the gasket is dimensioned to extend outwardly around the periphery of the exhaust fan and base for the exhaust fan.

7. The device of claim 6 wherein the gasket is further configured to form a gutter around the periphery of the exhaust fan and base for the exhaust fan.

8. The device of claim 7 further including a plurality of perforations formed in the gasket, wherein when the gasket is configured to form a gutter, at least some of the perforations are in the gutter.

9. The device of claim 7 further including a pad formed of sorbent material, the pad dimensioned for placement in some portion of the gutter.

10. The device of claim 5 further including at least one strap for attaching the gasket around the periphery of the base for the exhaust fan.

11. The device of claim 5 wherein the gasket material is formed substantially of polypropylene.

12. The device of claim 11 wherein the gasket material will absorb at least 4 quarts of grease per square yard.

13. The device of claim 5 wherein the gasket comprises a cuttable sheet material.

14. A rooftop exhaust fan system, comprising:
   (a) an exhaust fan;
   (b) a base for mounting the exhaust fan thereon;
   (c) a gasket formed of sorbent material;
   (d) the gasket being dimensioned for placement between the exhaust fan and the base for the exhaust fan; and
   (e) wherein when placed between the exhaust fan and the base for the exhaust fan, grease is absorbed and retained by the gasket.

15. The system of claim 14 wherein the gasket is dimensioned to extend outwardly around the periphery of the exhaust fan and base for the exhaust fan.

16. The system of claim 15 wherein the gasket is further configured to form a gutter around the periphery of the exhaust fan and base for the exhaust fan.

17. The system of claim 16 further including a plurality of perforations formed in the gasket, wherein when the gasket is configured to form a gutter, at least some of the perforations are in the gutter.

18. The system of claim 16 further including a pad formed of sorbent material, the pad dimensioned for placement in some portion of the gutter.

19. The system of claim 14 further including at least one strap for attaching the gasket around the periphery of the base for the exhaust fan.

20. The system of claim 14 wherein the gasket material is formed substantially of polypropylene.

21. The system of claim 20 wherein the gasket material will absorb at least 4 quarts of grease per square yard.

22. The system of claim 14 wherein the gasket comprises a cuttable sheet material.

* * * * *